US011525684B2

(12) United States Patent
Kozhaya et al.

(10) Patent No.: US 11,525,684 B2
(45) Date of Patent: Dec. 13, 2022

(54) ASSISTIVE MECHANISM VIA EDGE DEVICE PERSONALIZATION

(71) Applicant: International Business Machines Corporation, Armonk, NY (US)

(72) Inventors: Joseph N. Kozhaya, Morrisville, NC (US); Shikhar Kwatra, Durham, NC (US); Andrew R. Freed, Cary, NC (US); Corville O. Allen, Morrisville, NC (US)

(73) Assignee: International Business Machines Corporation, Armonk, NY (US)

( * ) Notice: Subject to any disclaimer, the term of this patent is extended or adjusted under 35 U.S.C. 154(b) by 449 days.

(21) Appl. No.: 16/690,663

(22) Filed: Nov. 21, 2019

(65) Prior Publication Data

US 2021/0156691 A1    May 27, 2021

(51) Int. Cl.
*G01C 21/00* (2006.01)
*G01C 21/20* (2006.01)
(Continued)

(52) U.S. Cl.
CPC ............... *G01C 21/20* (2013.01); *G06N 3/04* (2013.01); *G06N 3/08* (2013.01)

(58) Field of Classification Search
CPC ............. G01C 21/20; G06N 3/04; G06N 3/08
(Continued)

(56) References Cited

U.S. PATENT DOCUMENTS

| 10,304,442 | B1 | 5/2019 | Rudden et al. |
| 2018/0181204 | A1 | 6/2018 | Weinraub |
| 2018/0253665 | A1 | 9/2018 | Okanohara et al. |

FOREIGN PATENT DOCUMENTS

| CN | 203234988 U | 10/2013 |
| CN | 107374921 A | 11/2017 |

(Continued)

OTHER PUBLICATIONS

Jinqiang Bai, Zhaoxiang Liu, Yimin Lin, Ye Li, Shiguo Lian, and Dijun Liu, "Wearable Travel Aid for Environment Perception and Navigation of Visually Impaired People," Jun. 2019, MDPI, whole article. (Year: 2019).*

(Continued)

*Primary Examiner* — Tyler J Lee
*Assistant Examiner* — Tiffany P Ohman
(74) *Attorney, Agent, or Firm* — Terrile, Cannatti & Chambers, LLP; Michael Rocco Cannatti (57) ABSTRACT

A method, system, and computer program product provide navigation guidance around various object types in a vicinity of a guidance assistance device for a user by analyzing received data regarding an environment around the guidance assistance device to identify one or more entities Ei and by applying an artificial intelligence machine learning analysis to group the one or more entities Ei into corresponding categories Cj and to determine a minimum spacing distance Dmin for each of the one or more entities Ei, wherein the minimum spacing distance Dmin is a minimum distance between the guidance assistance device and the entity Ei based on the categorization Ci specified by the user, and then providing feedback to the user when any of the one or more entities Ei is within than minimum spacing distance Dmin corresponding to said entity.

20 Claims, 4 Drawing Sheets

(51) Int. Cl.
  *G06N 3/04* (2006.01)
  *G06N 3/08* (2006.01)
(58) Field of Classification Search
  USPC .......................................................... 701/433
  See application file for complete search history.

(56) References Cited

FOREIGN PATENT DOCUMENTS

CN   107830866 A   3/2018
KR   101957648 B1  3/2019

OTHER PUBLICATIONS

Piyush Chanana, Rohan Paul, M Balakrishnan, and PVM Rao, "Assistive technology solutions for aiding travel of pedestrians with visual impairment," Jul. 2017, Journal of Rehabilitation and Assistive Technologies Engineering, vol. 4: 1-16, whole article. (Year: 2017).*

Aatreya Chakravarti et al., Blindsight: Proximity Sensing and Wireless Haptic Feedback, Worcester Polytechnic Institute, Digital WPI, Apr. 2019.

The Economist, White Cane 2.0—VRSGA, Science and Technology, Jun. 8, 2017.

Maria De Los Angeles Constantino Gonzalez et al., Coaching Web-based Collaborative Learning based on Problem Solution Differences and Participation, International Journal of Artificial Intelligence in Education 13, May 21, 2014, http://www.cogs.susx.ac.uk/ijaied/abstracts/Vol_13/constantino.html.

Anonymous, Reinforcement Learning for Fuzzing Testing Techniques, ip.com, IPCOM000252021D, Dec. 13, 2017.

Anonymous, User Interface and Application Programming Interface for Explaining Personalized Machine-Learned Model Outputs, IPCOM000252271D. Jan. 3, 2018.

Anonymous, Optimizing Route Guidance to Preserve User Loyalty, IPCOM000252346D, Jan. 5, 2018.

Slim Kammoun et al., Navigation and space perception assistance for the visually impaired: The NAVIG project, IRBM, Elsevier Masson, Apr. 2012.

Cool Blind Tech Inc., Microsoft Develops Device That Helps Blind and Visually Impaired Navigate Virtual Spaces, Mar. 1, 2018.

Brian Heater, MIT Develops a vibrating wearable to help people with visual impairments navigate, Jun. 2, 2017.

Chaoyun Zhang et al., Deep Learning in Mobile and Wireless Networking: A Survey, IEEE Communications Surveys & Tutorials, vol. 21, Issue 3, Mar. 13, 2019.

* cited by examiner

ASSISTIVE MECHANISM VIA EDGE DEVICE PERSONALIZATION

BACKGROUND OF THE INVENTION

With the burgeoning demand for assistive devices to aid people suffering from visual or aural impairment, there are guidance devices or relationships to assist them in navigating and interacting with their environments. For example, some blind people may use a cane or guide animal in order to navigate and interact with an environment, but there are also applications and embedded hardware controls which help with navigation through physical and/or virtual surroundings. However, these devices are of limited use in terms of assisting the sensorially-impaired person as they tend to possess static and unchanging designs and/or operational performance which are designed for a generic user and/or unspecified operating environment. For example, a generically designed guidance device may not be able to detect specific conditions or navigation obstacles in a given environment may pose a risk that is unique to a particular person. As a result, the existing solutions for guiding sensory impaired people navigating and interacting with their environments are deficient at a practical and/or operational level.

SUMMARY

Broadly speaking, selected embodiments of the present disclosure provide a guidance assistance device, system, method, and apparatus for optimally aiding the navigation of a visually-impaired user through an environment by processing video/image data of an environment collected by a camera to dynamically identify and classify different objects or entities $E_i$ into associated categorizations $C_i$ ($C_1$, $C_2$, ..., $C_n$) and a detected distances $D_i$ ($D_1$, $D_2$, ..., $D_n$) for purposes of evaluation against user-specific distance preferences for each category by applying artificial intelligence (AI) machine learning (ML) techniques, such as a reinforcement learning model, to provide feedback information to the user about the location or position of selected objects or entities in the environment. In selected embodiments, the guidance assistance device is embodied as an edge device that is personalized for a visually-impaired user to assist with optimal navigation through an environment by dynamically classifying different objects/entities and correlating the edge device to respond to the different objects/entities in a personalized way for the given user via reinforcement learning model and synchronization with other edge devices to provide assistive feedback to the user. The guidance assistance device may provide personalized feedback information based on user feedback and/or user heuristics which specify proximity distance measures for different objects/entities, such as people (male or female individuals), animals (e.g., menacing or friendly dogs or cats), moving or stationary vehicles, etc. For instance, a given user may specify a minimum distance to keep from people owning pets or even high-speed vehicles driving on the curb side (user's preferences may vary based on their nature/demographics), but may specify a different minimum distance where the user is more comfortable with other physical entities, like kids walking around the park/pavement. In addition, the minimum distances may be dynamically adjusted based on a state of the user (e.g., the user's comfort level) and/or the identified object/entity (e.g., a minimum distance is increased for a growling or barking dog). In selected embodiments, the guidance assistance device disclosed herein may provide haptic/auditory feedback to the user to keep a minimum specified distance from an identified object along a line of sight by using a machine learning model which adapts to user input specifying the adversity/repercussions of getting too close to objects which the user considers to be dangerous or undesirable. For example, the feedback information may be provided to a wearable device which indicates to the user when an object or entity is within a minimum specified distance to the user with feedback selected from a group consisting of audio, visual, and haptic based on user's profile. In this way, each guidance assistance edge device may be trained to work in sync with other edge devices based on identifying or determining the external entities and ingesting personalized heuristics to optimally aid the visually impaired user in navigating through a given contextual environment in an adaptive fashion. In addition to being used with visually impaired users, the guidance assistance device may be used to assist autistic consumers who have different preferences in navigating through crowded spaces.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

The present invention may be a system, a method, and/or a computer program product. In addition, selected aspects of the present invention may take the form of an entirely hardware embodiment, an entirely software embodiment (including firmware, resident software, micro-code, etc.) or an embodiment combining software and/or hardware aspects that may all generally be referred to herein as a "circuit," "module" or "system." Furthermore, aspects of the present invention may take the form of computer program product embodied in a computer readable storage medium (or media) having computer readable program instructions thereon for causing a processor to carry out aspects of the present invention. Thus embodied, the disclosed system, a method, and/or a computer program product is operative to improve the functionality and operation of a cognitive question answering (QA) systems by efficiently providing more accurate training QA pairs.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a dynamic or static random access memory (RAM), a read-only memory (ROM), an erasable programmable read-only memory (EPROM or Flash memory), a magnetic storage device, a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server or cluster of servers. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments described herein may permit a sensory-impaired user to quickly and efficiently navigate or otherwise interact with the user's environment. Sensory-impaired users may use a guidance assistance device which combines video processing and artificial intelligence techniques to provide guidance to the user about the location or distance proximity to objects in the environment to aid the user's interaction therewith. The guidance assistance device may detect information about objects in the environment, model the environment using a reinforcement learning model and specified user preferences, and present guidance output based on the model with user feedback that may be tactile so the user can quickly and efficiently navigate the environment. In the disclosed guidance assistance devices for sensory impaired users, sensor data may be obtained regarding an environment around a guidance device, assistance device, environmental exploration device, an/or other such device, such as by using a camera that is embedded in an assisted reality (AR) device being worn by the user to communicate with user's mobile/wearable devices. A reinforcement learning model of the environment may be generated based on the sensor data and user-specified distance preference information to generate tactile output for guiding the user through the environment by specifying minimum distance measures to detected objects in the environment. The guidance assistance device may include a variety of different components, such as sensors that obtain data regarding the environment, input/output mechanisms for receiving input from and/or providing input to the user, processing units and/or other components for generating the model and/or mapping the model to various input/output mechanisms, and so on. Additionally, the guidance assistance device may synchronize, cooperate and/or communicate with a variety of different edge devices that have one or more such components in order to perform one or more of these functions. These and other embodiments are discussed below with reference to FIGS. 1-4. However, those skilled in the art will readily appreciate that the detailed description given herein with respect to these Figures is for explanatory purposes only and should not be construed as limiting.

Figure 1:
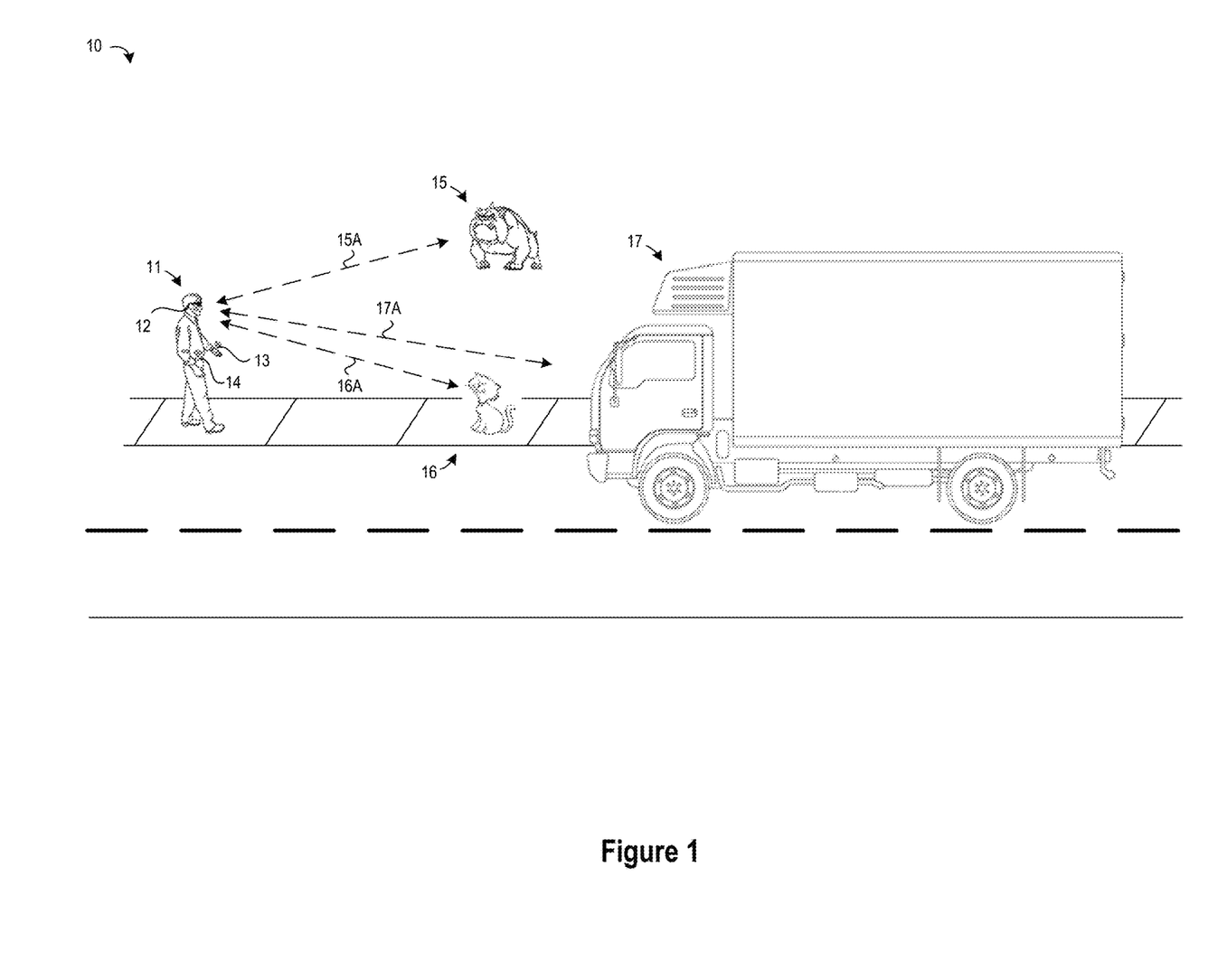
FIG. 1 is a simplified illustration showing a user navigating an example environment using a guidance assistance device in accordance with selected embodiments of the present disclosure.

Turning now to FIG. 1, there is shown a simplified illustration of a user 11 using a guidance assistance device 12-14, environmental exploration device, and/or other such device to navigate an example environment 10 in which a number of objects 15-17 are located. Illustrated as a combination of networked devices 12-14, the guidance assistance device components are connected and configured to detect information about the user's environment 10 and to present that information to the user to aid the interaction of the user 11 with the environment 10. In the illustrated example, the user 11 is wearing a pair of smart glasses 12 which include an embedded camera device and a wireless transceiver. In addition, the user 11 may be wearing a wearable device, such as a watch 13 and/or mobile device 14 while walking down a street. Along the street in front of the user 11 is a menacing dog 15 off to one side, an adorable kitten 16 on the sidewalk, and an approaching vehicle 17 on the road, and so on. With an embedded camera on the smart glasses 12, visual information 15A about the dog 15 is collected by the guidance assistance device 12-14, along with visual information 16A about the kitten 16 and visual information 17A about the vehicle 17. Using one or more processor devices at the watch 13 and/or mobile device 14, an object identification or classifier analysis may be applied to the captured visual information 15A-17A to identify entities E (E1, E2, . . . En), followed by additional clustering analysis to group the identified entities into categories C (C1, C2, . . . , Cn). In addition, the processor device(s) may compute or otherwise determine a corresponding distance measures D (D1, D2, . . . , Dn) to each entity.

At the guidance assistance device 12-14 (or a remote server computer system), artificial intelligence and/or machine learning analysis is applied to determine a minimum distance from the user to each identified entity Ei based on the categorization Ci preferred by a user. For example, a reinforcement learning model may be applied to respond in a personalized form to the given user to determine the preferences of the user 11 for distance proximity to the detected objects 15-17. As the guidance assistance device 12-14 continues to measure the distance between to each entity, the guidance assistance device 12-14 may be configured to provide the user 11 with a tactile, audio, and/or other guidance feedback related to the environment 10 upon detecting that an object located in the environment 10 is approaching or within a minimum distance for the object. Though not expressly shown, the guidance assistance device component(s) 12-14 may be wired and/or wirelessly transmitting and/or receiving information with one another and/or with a wireless network of devices (not shown) in order to communicate with one or more of each other. Such devices may communicate with each other in order to obtain environmental or other sensor data regarding the environment, generate a model based on the sensor and user preference data, and provide the guidance output to the user 11 as described more fully hereinbelow.

Figure 2:
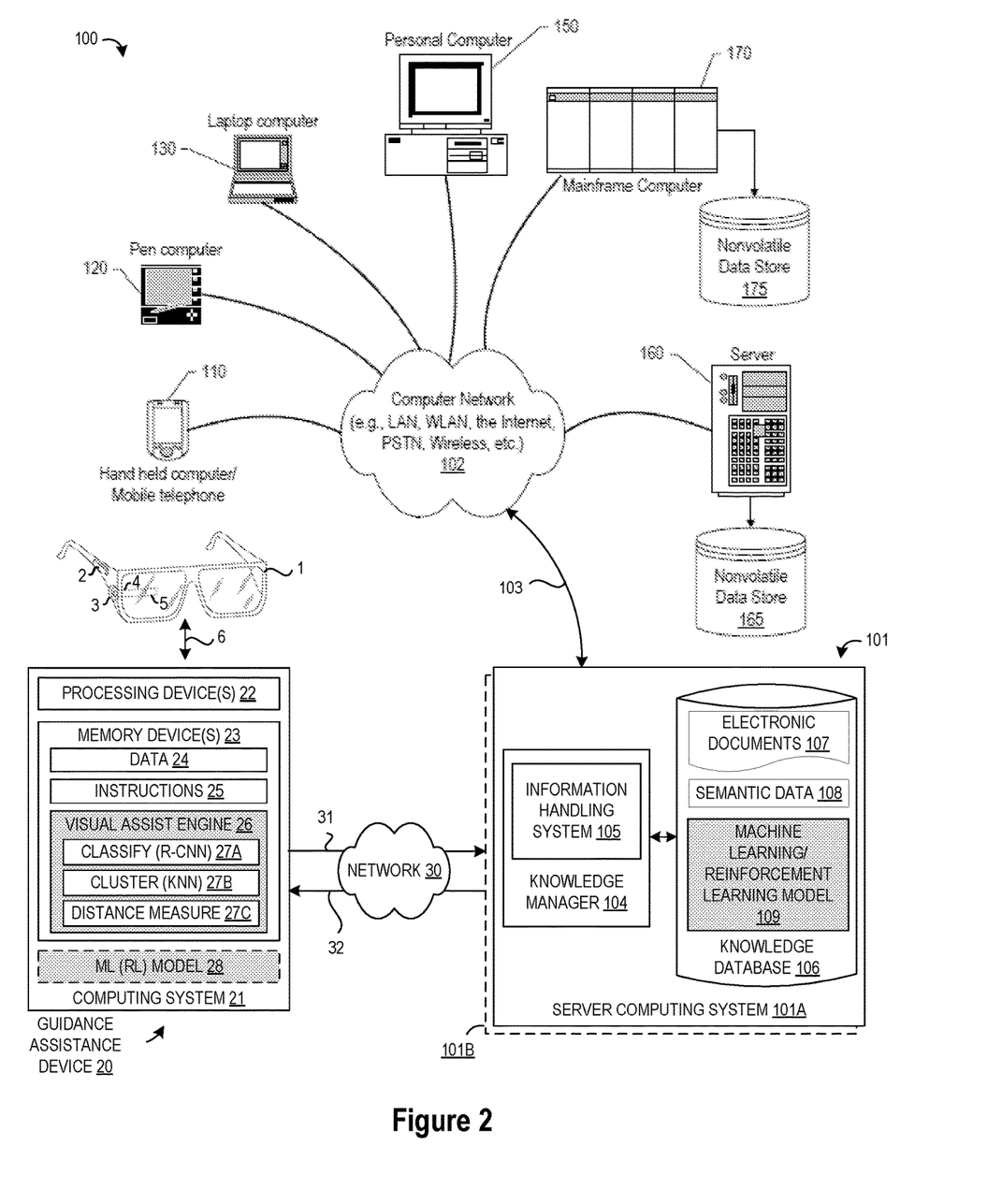
FIG. 2 depicts a system diagram that includes a guidance assistance device connected in a network environment to a computing system that uses a reinforcement learning model to provide personalized navigation assistance in accordance with selected embodiments of the present disclosure.

To provide additional details for an improved understanding of selected embodiments of the present disclosure, reference is now made to FIG. 2 which schematically depicts a system diagram 100 of one illustrative embodiment of a guidance assistance device 20 which includes a visual input device 1 and computing system 21 connected in a network environment 30 to a server computing system 101 that uses a reinforcement learning model 109 to provide personalized navigation assistance to a user. In the depicted example, the visual input device 1 may be embodied as a pair smart glasses having a lens frame and temple or earpiece extensions. As depicted, a camera 3 may be embedded in the lens frame and/or temple piece of the visual input device 1 to capture visual information about the surrounding environment. In addition, an assist processor 2, such as a single chip microcomputer (SCM), may be affixed or embedded to the lens frame and/or temple piece to perform digital processing on the captured visual information and/or to provide a communication link 6 over a wireless transceiver (not shown) to the computing system 21. The visual input device 1 may also include an optical head-mounted display (OHMD) 4 or embedded wireless glasses with transparent heads-up display (HUD) or augmented reality (AR) overlay 5.

Visual information captured by the visual input device 1 may be processed in whole or in part with the assist processor 2 and/or the computing system 21 which is illustrated as including one or more processing devices 22 and one or more memory devices 23 which are operatively connected together with other computing device elements generally known in the art, including buses, storage devices, communication interfaces, and the like. For example, the processing device(s) 22 may be used to process the captured visual information data 6 received from the visual input device 1 for storage in the memory device(s) 23 which stores data 24 and instructions 25. In accordance with selected embodiments of the present disclosure, the stored data 24 and instructions 25 may embody a visual assist engine 26 which is configured provide guidance assistance for optimally aiding the navigation of a visually-impaired user through an environment by processing video/image data of an environment collected by the visual input device 1.

To this end, the visual assist engine 26 may include a first classifier module 27A for dynamically identifying and classifying different objects or entities Ei in the captured visual information as the user or agent is navigating through the environment. In selected embodiments, the first classifier module 27A may employ any suitable classification or object detection algorithm, such as Region-Based Convolutional Neural Networks (R-CNN), fast R-CNN, faster R-CNN, or the like, to identify the objects or entities in space while the user/agent is navigating through a given environment. For example, an R-CNN object detection module 27A may be used to monitor the state space by segmenting the captured visual context/video into chunks of frames F={f1, f2, f3 . . . fn} with delta variations in time T={t1, t2, t3 . . . tn}, and then identifying different entities E (E1, E2, . . . En) in the environmental space where the user/agent is navigating through said frames. In this way, the visual assist engine 26 analyzes the captured visual information to identify objects or entities in the proximate environment of the user/agent.

To further assist with object/entity identification, the visual assist engine 26 may also include a second cluster module 27B for clustering the identified object/entities into specific categories (such as kids, dogs, cats, person (male/female), vehicle, vehicle type, etc.) for storage in the data frame. In selected embodiments, the second cluster module 27B may employ any suitable classification and regression algorithm, such as k-nearest neighbor (KNN), k-means clustering, or the like, to group or cluster the identified objects/entities into categories. For example, a K-nearest neighbor (KNN) algorithm may be used in conjunction with CNN to cluster the entities into a specific category by assessing the type of data frame and associated attributes. For example, if the identified entities from the capture video are kids of varying ages but seemingly young, they would be clustered by the KNN module 27B into a first category K1. In addition, entities identified as Male would be clustered by the KNN module 27B into a second category M, entities identified as Female would be clustered as a third category F, and entities identified as a Vehicle would be clustered into a fourth category V. In addition, each category may have a specified categorical feature set activated. For example, a Vehicle type can be clustered into different categories (Large (truck), medium (sedan/cars), Small (motorbike/scooters), etc.

The visual assist engine 26 may also include a third distance measure module 27C for measuring or detecting the distance between the user/agent and each identified object/entity. In selected embodiments, the third distance measure module 27C may employ any suitable distance measurement technique, including but not limited to analysis of the captured visual information, radar-based measurements, or the like. For example, the smart glasses 1 may compute the detected distances Di (D1, D2, . . . Dn) from the smart glasses to each entity Ei (E1, E2, . . . En) by using known parameters (e.g., knownWidth, focalLength, perWidth) to compute a return distance from the entity to the glass or to otherwise determine a current user/agent position p and distance d from the object/entity.

Either at the guidance assistance device 20 or a remote server computing device 101, a machine learning model is trained and deployed to allow the user/agent to keep the appropriate distance from objects in the real-world space based on reinforcement learning for defined categories of objects in the space (e.g., people, dogs, cats, heaters, cars, etc.), each of which has a defined hostility/personal space profile or minimum distance requirement specifying how close an individual would prefer to be in spatial relation to the identified entities or objects as they navigate a path to their destination. For example, the computing system 21 may include a machine learning (ML) model 28, such as a reinforcement learning model, that is deployed to generate an optimal notification to assist the user in navigating through the given environment. In addition, each guidance assistance device 20 may be trained to work in sync with other guidance assistance devices which are configured to identify external entities and ingest personalized heuristics for assisting the user in navigating through a given contextual environment in an adaptive fashion.

In selected embodiments, the machine learning (ML) or reinforcement learning (RL) model 28 may be configured with control code and/or software functionality for generating state transition probabilities, observation probabilities, a reward function, or any combination thereof based on one or more modeled or observed events. In an example embodiment, the reinforcement learning model 28 may be trained to evaluate one or more events or interactions, which may be simulated events (such as identifying an object or entity in the proximate environment of the use, associate sounds with entities or the environment), and to generate or modify a corresponding model, or a solution thereof, in response to the event. For example, a user who is traversing a street intersection may use the reinforcement learning model 28 to indicate a user navigation control action for navigating along a street path by prescribing specific minimum distances for any object detected in the path. To this end, the visual assist engine 26 may be configured to provide the RL model 28 with outputs from the first classifier (R-CNN) module 27A and second cluster (KNN) module 27A where they are processed as state-environment parameters in the reinforcement learning model framework 28 which computes user/agent diversion actions based on ingestion of heuristics pertaining to classification of different objects in said frames in increasing level of risk. For example, the RL model 28 may compute a reward function Rf value based on the user's risk or comfort score with respect to an identified object or entity, such that the reward function Rf is increased if the risk score decreases for the user/agent, and is decreased if the risk score increases for the user/agent:

a. Rf=+1 if the risk score <0.5, and
  b. Rf=−1 if the risk score >0.5

As a result, reinforcement learning model framework 28 may continuously monitor the relative proximity distances between the user/agent and identified objects in order to detect when the user/agent moves too close to an object deemed as dangerous in order to provide a timely warning to the user/agent. For example, the reinforcement learning model framework 28 may continually monitor, update, and compare the reward function or risk score against a penalty or warning threshold value to determine when the minimum distance measure is violated for a high-risk entity (e.g., risk score >0.8). As disclosed herein, the minimum distance measure and advance warning times to provide optimal feedback to the user/agent may be varied for each of the entities E={E1, E2, . . . En} in order to reduce the risk score in an iterative fashion.

To enable personalized user feedback of the desired minimum proximity distance for detected entities, the visual assist engine 26 may also include a feedback sensor (e.g., keypad or audio detector) to provide personalized feedback information from the user feedback and/or user heuristics which specify minimum proximity distance measures for different objects/entities and associated states or conditions, such as people (male or female individuals), animals (e.g., menacing or friendly dogs or cats), moving or stationary vehicles, etc. For instance, a given user may specify a minimum distance to keep from people owning pets or even high-speed vehicles driving on the curb side (user's preferences may vary based on their nature/demographics), but may specify a different minimum distance where the user is more comfortable with other physical entities, like kids walking around the park/pavement. In addition, the minimum distances may be dynamically adjusted based on a state of the user (e.g., the user's comfort level) and/or the identified object/entity (e.g., a minimum distance is increased for a growling or barking dog).

As disclosed herein, the reinforcement learning model framework 28 may generate user navigation control actions to direct the user's temporal location in relation to the detected objects by providing alerts to the user/agent about the location of detected objects. For example, the reinforcement learning model framework 28 may initiate a trigger message with a payload (e.g., json: <auditory message notification, distance, object in space and directions to move, haptic feedback type>) that is provided to a wearable device/glass 6, such as by conveying the trigger message over the wireless communication link 6 to update the visually-impaired user/agent to maintain x distance from the object in order to maximize safety for the user/agent. In addition or in the alternative, the guidance assistance device 20 may include a haptic and/or auditory feedback generator, such as, for example, a vibrator or audio speaker (not shown) to provide personalized navigation guidance feedback when a specified minimum proximity distance measure for an object/entity is approaching or met. In selected embodiments, the guidance assistance device 20 may provide haptic/auditory feedback to the user to keep a distance from a certain object along line of trail/sight when user-specified feedback specifies the adversity/repercussions with respect to an identified object. For example, the feedback information may be provided to a wearable device which indicates to the user when an object or entity is within a minimum specified distance to the user with feedback selected from a group consisting of audio, visual, and haptic based on user's profile.

As indicated with the dashed lines around the machine learning (ML) model 28 block, the model may be located in whole or in part in the guidance assistance device 20 and/or computing system 21, but may alternatively be located in the server computing system 101 which is connected to exchange data 31, 32 over the network 30 with the guidance assistance device 20. In such embodiments, the server computing system 101 may include one or more system pipelines 101A, 101B, each of which includes a knowledge manager computing device 104 (comprising one or more processors and one or more memories, and potentially any other computing device elements generally known in the art including buses, storage devices, communication interfaces, and the like) for processing information data 31 received from the guidance assistance device 20, as well as information data 103 received over the network 102 from one or more users at computing devices (e.g., 110, 120, 130). Over the network(s) 30, 102, the computing devices communicate with each other and with other devices or components via one or more wired and/or wireless data communication links, where each communication link may comprise one or more of wires, routers, switches, transmitters, receivers, or the like. In this networked arrangement, the computing systems 21, 101 and networks 30, 102 may be used with components, systems, sub-systems, and/or devices other than those that are depicted herein.

In the server computing system 101, the knowledge manager 104 may be configured with an information handling system 105 to receive inputs from various sources. For example, knowledge manager 104 may receive input from the network 102, one or more knowledge bases or corpora 106 of electronic documents 107, semantic data 108, or other data, content users, and other possible sources of input.

In selected embodiments, the knowledge base 106 may include structured, semi-structured, and/or unstructured content in a plurality of documents that are contained in one or more large knowledge databases or corpora. In addition, the server computing system 101 may be connected to communicate with different types of information handling systems which range from small handheld devices, such as handheld computer/mobile telephone 110 to large mainframe systems, such as mainframe computer 170. Examples of handheld computer 110 include personal digital assistants (PDAs), personal entertainment devices, such as MP3 players, portable televisions, and compact disc players. Other examples of information handling systems include pen or tablet computer 120, laptop or notebook computer 130, personal computer system 150, and server 160. As shown, the various information handling systems can be networked together using computer network 102. Types of computer network 102 that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems may use separate non-volatile data stores (e.g., server 160 utilizes nonvolatile data store 165, and mainframe computer 170 utilizes nonvolatile data store 175). The nonvolatile data store can be a component that is external to the various information handling systems or can be internal to one of the information handling systems. An illustrative example of an information handling system showing an exemplary processor and various components commonly accessed by the processor is shown in FIG. 3.

Figure 3:
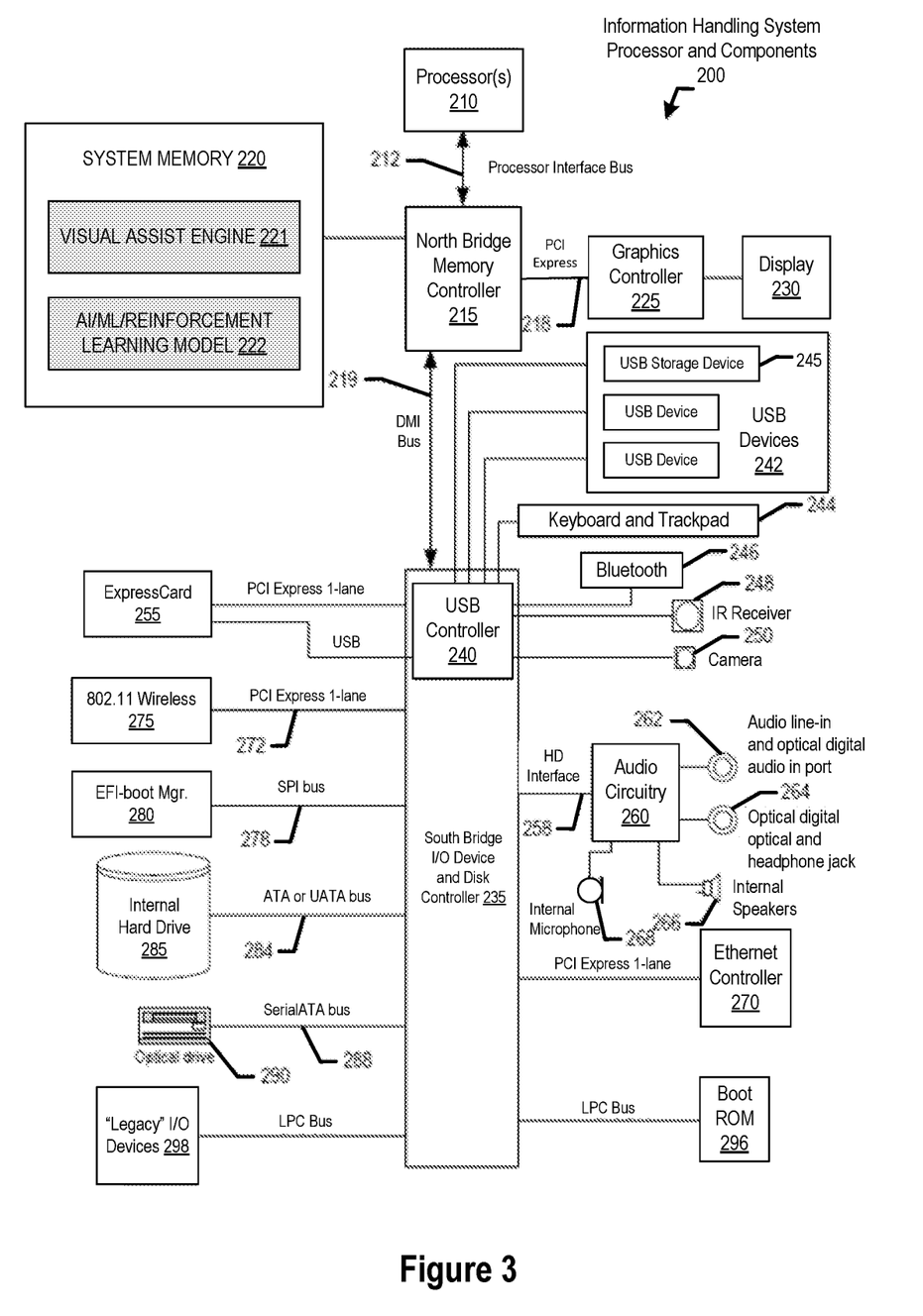
FIG. 3 is a block diagram of a processor and components of an information handling system such as those shown in FIG. 2.

To provide additional details for an improved understanding of selected embodiments of the present disclosure, reference is now made to FIG. 3 which illustrates an information handling system 200, more particularly, a processor and common components, which is a simplified example of a computer system capable of performing the computing operations described herein. Information handling system 200 includes one or more processors 210 coupled to processor interface bus 212. Processor interface bus 212 connects processors 210 to Northbridge 215, which is also known as the Memory Controller Hub (MCH). Northbridge 215 connects to system memory 220 and provides a means for processor(s) 210 to access the system memory. In the system memory 220, a variety of programs may be stored in one or more memory devices, including a visual assist engine module 221 which may be invoked for processing video/image data of an environment to dynamically identify and classify different objects or entities $E_i$ into associated categorizations $C_i$ (C1, C2, . . . , Cn) and a detected distances $D_i$ (D1, D2, . . . , Dn) for purposes of evaluation against user-specific distance preferences for each category in order to provide user navigation control actions to help with user navigation through an environment. In addition or in the alternative, the system memory 220 may include an artificial intelligence (AI) machine learning (ML) model 222, such as a reinforcement learning model, which is trained to provide feedback information to the user about the location or position of selected objects or entities in the environment. Graphics controller 225 also connects to Northbridge 215. In one embodiment, PCI Express bus 218 connects Northbridge 215 to graphics controller 225. Graphics controller 225 connects to display device 230, such as a computer monitor.

Northbridge 215 and Southbridge 235 connect to each other using bus 219. In one embodiment, the bus is a Direct Media Interface (DMI) bus that transfers data at high speeds in each direction between Northbridge 215 and Southbridge 235. In another embodiment, a Peripheral Component Interconnect (PCI) bus connects the Northbridge and the Southbridge. Southbridge 235, also known as the I/O Controller Hub (ICH) is a chip that generally implements capabilities that operate at slower speeds than the capabilities provided by the Northbridge. Southbridge 235 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 296 and "legacy" I/O devices (using a "super I/O" chip). The "legacy" I/O devices (298) can include, for example, serial and parallel ports, keyboard, mouse, and/or a floppy disk controller. Other components often included in Southbridge 235 include a Direct Memory Access (DMA) controller, a Programmable Interrupt Controller (PIC), and a storage device controller, which connects Southbridge 235 to nonvolatile storage device 285, such as a hard disk drive, using bus 284.

ExpressCard 255 is a slot that connects hot-pluggable devices to the information handling system. ExpressCard 255 supports both PCI Express and USB connectivity as it connects to Southbridge 235 using both the Universal Serial Bus (USB) the PCI Express bus. Southbridge 235 includes USB Controller 240 that provides USB connectivity to devices that connect to the USB. These devices include webcam (camera) 250, infrared (IR) receiver 248, keyboard and trackpad 244, and Bluetooth device 246, which provides for wireless personal area networks (PANs). USB Controller 240 also provides USB connectivity to other miscellaneous USB connected devices 242, such as a mouse, removable nonvolatile storage device 245, modems, network cards, ISDN connectors, fax, printers, USB hubs, and many other types of USB connected devices. While removable nonvolatile storage device 245 is shown as a USB-connected device, removable nonvolatile storage device 245 could be connected using a different interface, such as a Firewire interface, etc.

Wireless Local Area Network (LAN) device 275 connects to Southbridge 235 via the PCI or PCI Express bus 272. LAN device 275 typically implements one of the IEEE 802.11 standards for over-the-air modulation techniques to wireless communicate between information handling system 200 and another computer system or device. Extensible Firmware Interface (EFI) manager 280 connects to Southbridge 235 via Serial Peripheral Interface (SPI) bus 278 and is used to interface between an operating system and platform firmware. Optical storage device 290 connects to Southbridge 235 using Serial ATA (SATA) bus 288. Serial ATA adapters and devices communicate over a high-speed serial link. The Serial ATA bus also connects Southbridge 235 to other forms of storage devices, such as hard disk drives. Audio circuitry 260, such as a sound card, connects to Southbridge 235 via bus 258. Audio circuitry 260 also provides functionality such as audio line-in and optical digital audio in port 262, optical digital output and headphone jack 264, internal speakers 266, and internal microphone 268. Ethernet controller 270 connects to Southbridge 235 using a bus, such as the PCI or PCI Express bus. Ethernet controller 270 connects information handling system 200 to a computer network, such as a Local Area Network (LAN), the Internet, and other public and private computer networks.

While FIG. 3 shows one information handling system, an information handling system may take many forms, some of which are shown in FIG. 2. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory. In addition, an information handling system need not necessarily embody the north bridge/south bridge controller architecture, as it will be appreciated that other architectures may also be employed.

To provide additional details for an improved understanding of selected embodiments of the present disclosure, there is provided hereinbelow a pseudocode description of the operating algorithm for training and deploying a reinforcement learning in an augmented reality (AR) edge device which iteratively categorizes and computes proximal distance measures for various object types in a vicinity of a person. In this example, the video content is captured in a time sequence Ti with different frames being processed at each timer interval (e.g., T1, T2, . . . Tn→F={F1, F2, . . . Fn}) to identify one or more Entities E→E1 . . . Ej in each frame Fm at time Tm which are classified (e.g., with the CNN classifier module 27A) and clustered (e.g., with the KNN cluster module 27B) into categories:

///CNN engine classifying the entities identified at time Tm in a frame Fm.
 # Initializing the CNN
 classifier=Sequential( )
 # Compiling the CNN
 classifier.compile(optimizer='adam', loss='categorical crossentropy', metrics=['accuracy'])
 KNN to cluster the given entity in a categorical feature set to generate: Clusters: {C1, C2 . . . Cn} created
///computing distance to the entity from the smart glass:
 def distance_to_glass(knownWidth, focalLength, perWidth):
 # compute and return the distance from the entity to the glass
 return d=(knownWidth*focalLength)/perWidth
 //D from a particular entity cluster identified i.e. Cm is fed to RL model as part of observations, i.e. current agent position p, distance d, from entity/entity cluster E'/Cn'
//User heuristics are proportional to safe distances predefined (gathered from given user's edge device-mobile device) or computed by assessing agent's reactions: Emotion API for classifying the danger/risk level pertaining to a given entity/cluster→E/C.
//RL model to ingest risk levels based on object classification and updated risk score to optimally trigger a haptic feedback and curate the distance from the entity/entities (normalization action) for a personalized user by running said mechanism on the edge device (smart glass with wearable).
Q value updated based on risk parameters and distance to an identified E/C in a given timeframe t.

```
User actions→batch_action <action sequence>: <angle A,
    direction of movement M (L, R, T, B)>
batch_state: Entities in a given state Em-En
•
class Dqn( ):
    def    learn(self,    batch_state,    batch_next_state,
        batch_reward, batch_action):
        outputs=self model(batch_state).gather(1, batch_ac-
            tion.unsqueeze(1)).squeeze(1)
        next_outputs=self.model(batch_next_state).
            detach( )max(1)[0]
        target=self.gamma*next_outputs+batch_reward
        td_loss=F.smooth_l1_loss(outputs, target)
        self.optimizer.zero_grad( )
        td_loss.backward(retain_variables=True)
        self.optimizer.step( )
Agent New State and reward/action computed with dis-
    tance d and new action fed to memory def update(self,
    reward, new_signal):
    new_state=torch.Tensor(new_signal).float( )unsqueeze
        (0)
        self.memory.push((self.last_state, new_state, torch.
            LongTensor([int(self.last_action)]),   torch.Tensor
            ([self.last_reward])))
    action=self.select_action(new_state)
    if len(self.memory.memory)>100:
        batch_state,    batch_next_state,    batch_action,
            batch_reward=self.memory.sample(100)
        self.learn(batch_state,    batch_next_state,
            batch_reward, batch_action)
    self.last_action=action
    self.last_state=new_state
    self.last_reward=reward
    return action //Action determined by the agent
def score(self): //Reward computed based on distance and
    risk score
    return    sum(self.reward_window)/(len(self.reward_
        window)+1.)
```

Based on above training, a user feedback trigger command is initiated with a payload (e.g., auditory message notification about distance, object in space and directions to move, haptic feedback in json) on the wearable device/glass via sensor data from the glass and wearable sensor data to update the visually impaired individual to maintain x distance for satisfaction maximization (objective).

Figure 4:
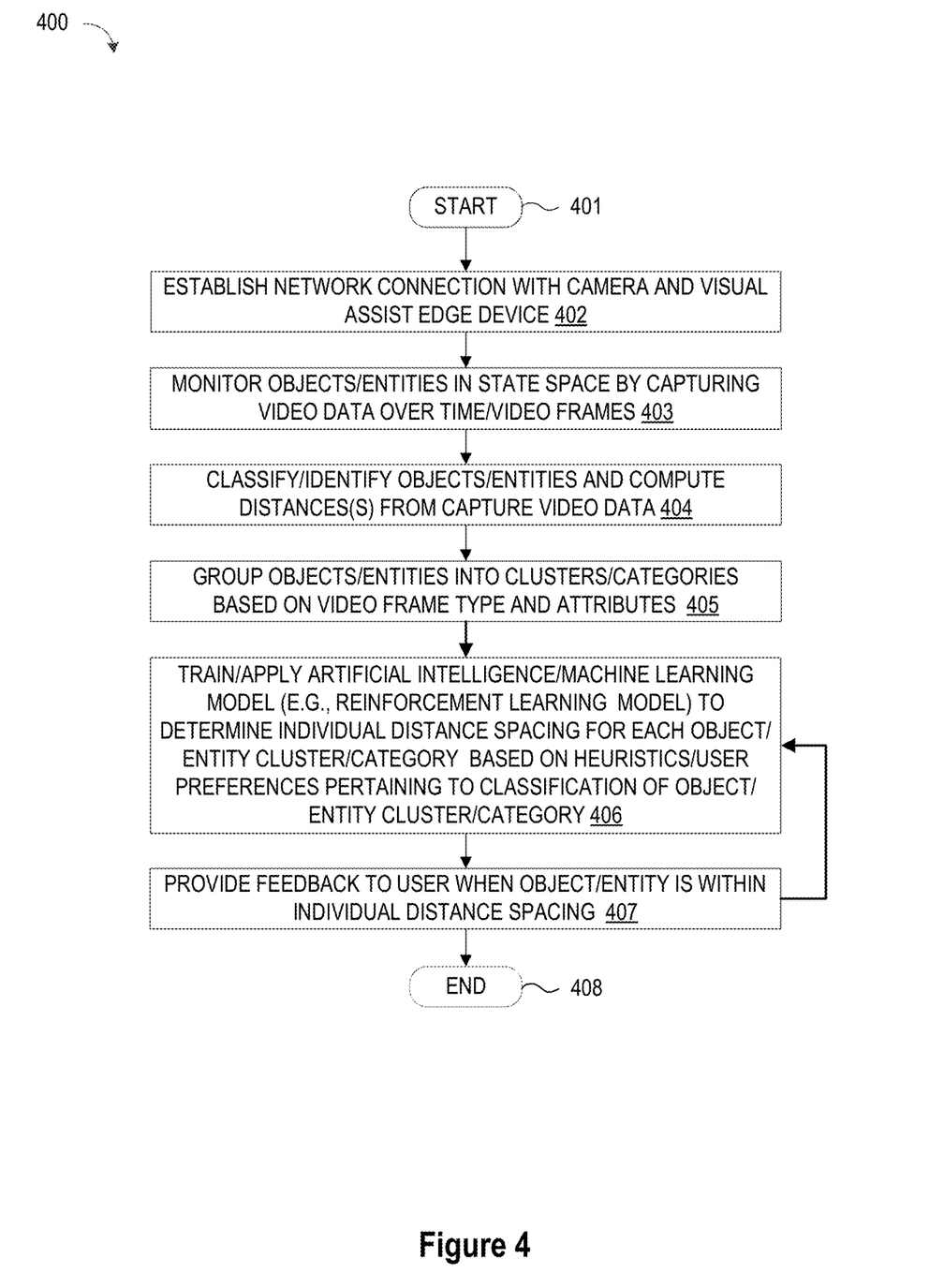
FIG. 4 illustrates a simplified flow chart showing the logic for aiding the navigation of a user through an environment in accordance with selected embodiments of the present disclosure.

To provide additional details for an improved understanding of selected embodiments of the present disclosure, reference is now made to FIG. 4 which depicts a simplified flow chart 400 showing the logic for aiding the navigation of a user through an environment in accordance with selected embodiments of the present disclosure. The processing shown in FIG. 4 may be performed by a cognitive system, such as the first computing system 21, server computing system 101, or other natural language question answering system.

FIG. 4 processing commences at 401, such as when user activates a visual assist edge device and/or turns ON a pair of smart glasses with an embedded camera and assist processor. As will be appreciated, the smart glasses may be provided separately from or integrated with a mobile visual assist edge device.

At step 402, a network connection is established between the visual input device (e.g., camera) and the visual assist edge device. For example, an adhoc wireless or Bluetooth network may be established between the smart glasses, the wearable device (e.g., watch) and/or the mobile visual assist edge device. As part of the established network, a wireless communication link may be established with a remote server computer system which hosts a reinforcement learning model in combination with synchronized communications with other edge devices to provide assistive feedback to the user and/or other mobile visual assist edge devices. As will be appreciated, any suitable network connection may be used to connect to the remote server computer system, including, but not limited to Intranet, Internet, Wireless communication network, Wired communication network, Satellite communication network, etc.

At step 403, the surrounding state space or environment is monitored for objects or entities over time by processing multiple video frames from the captured video data. In selected embodiments, the monitoring process may be performed by using the smart glasses to capture video data of the surrounding environment for monitoring the objects, though other techniques may be used.

At step 404, the objects in the surrounding environment are identified and/or classified and associated distance measure are determined from the captured video data. In selected embodiments, a first computing system (e.g., computing system 21) may process captured video data from the smart glasses with a visual assist engine to classify or identify objects or entities in the surrounding environment which are identified in the captured video data. For example, an R-CNN classification algorithm may be executed on the smart glass with the assist processor to identify the entities (e.g., kids, dogs, cats, person (male/female), vehicle, vehicle type) in the state space while the agent is navigating through a given environment. In this way, state space monitoring is initiated as part of reinforcement learning model using R-CNN. In addition, the first computing system (e.g., computing system 21) may process captured video data to calculate a distance measure to each identified object using known parameters (e.g., knownWidth, focalLength, perWidth) to compute a return distance from the entity to the glass or to otherwise determine a current user/agent position p and distance d from the object/entity. However, it will be appreciated that any suitable distance detection technique (e.g., radar) may be used to determine the distances between proximate objects and the user.

At step 405, the identified objects or entities in the surrounding environment are grouped into clusters or categories based on the video frame type and attributes. In selected embodiments, a first computing system (e.g., computing system 21) may process the identified objects or entities using vector processing techniques to group or cluster vector representations of each identified entity. For example, a K-nearest neighbor (KNN) algorithm may be executed in conjunction with CNN to cluster the entities into specific categories (e.g., clustering kids in a certain age range, clustering persons by gender, clustering vehicles by size and/or speed, etc.). In other embodiments, a k-means clustering algorithm may be executed to categorize other objects based on similarity in attributes to classified objects.

At step 406, machine learning, natural language processing (NLP), and/or artificial intelligence (AI) processing techniques are applied, alone or in combination, to automatically determine individual minimum distance spacing preferences for each object or entity cluster or category based on heuristics and/or user preferences pertaining to each object/entity cluster/category. In step 406, process any audio data and associate with entities based on audio classification and utilize natural language processing when audio is speech and converted to text. For example, a barking sound will be identified as a bark, and associated with that type of entity in the screen, which then changes the state of entity, in this case a dog; a modification of an entity E1, which is a dog, would be a "barking dog" or "angry dog" and not just a dog to represent E1. The natural language audio may be associated with an individual or the environment for use in analysis. A modification of an entity E1, which is a dog, would be a "barking dog" or "angry dog" and not just a dog to represent E1. In selected embodiments, a server computing system (e.g., computing system 101) and/or first computing system 21 may employ artificial intelligence processing techniques, such as a machine learning model or reinforcement learning model, which are applied to the identified entities E (E1, E2, . . . En) identified at step 404 and/or categorization C (C1, C2, . . . Cn) generated at step 405 to compute, for each entity, a corresponding minimum distance spacing Dmin (Dmin1, Dmin2, . . . Dminn) from the entity Ei based on the categorization Ci preferred by a user. In selected embodiment, the minimum distance spacing Dmini is adjusted based on a state of the entity Ei so that, for example, an "angry" dog has a larger minimum distance spacing than a "happy" dog. In addition or in the alternative, the minimum distance spacing Dmini may be iteratively monitored and adjusted based on learning or observing heuristics and/or the user's comfort level for co-existing in proximity with a detected entity Ei.

In accordance with selected embodiments of the present disclosure, a reinforcement learning (RL) module may be implemented at step 406 which takes into account four parameters: State S, Agent A, Reward R, and environment E. In this case, the environment parameter E specifies an environment where the user is navigating. In addition, the state parameter S specifies the state of the user at a particular step in time T with a group of entities in space. The agent parameter A specifies a software agent running in the cloud/edge device/AR device which is capable of taking an action A' for helping the user transition from State S1 to S2, and may be quantified with a transition probability measure PT→S1 to S2 acted upon by agent A in a given environment E. The reward parameter R specifies a reward or penalty function which is updated or adjusted based on user feedback. For example, a reward function (RF) can be incremented by an increment value x (e.g., RF=RF+x) which represents a positive step that is taken to assist the user and a positive feedback is exhibited/received by the user. In addition or in the alternative, a penalty function (PF) can be decremented by an decrement value y (e.g., PF=PF−y) where y can be a value assigned proportional based on the level of dissatisfaction or incorrect guidance provided. In selected embodiments of the reinforcement learning module, a Deep Q-Network (DQN) algorithm may be applied which uses a Q table to take into account how the user is transitioning from one state to another. As demonstrated with the DQN algorithm example below, the target Q function (in the rectangle block) basically keeps track of reward function, state transition parameters, etc. to keep track of how to maximize the reward function over multiple iterations and achieve a global maxima:

$$Q(s_t, a) \leftarrow Q(s_t, a) + \alpha \left[ r_{t+1} + \gamma \max_p \boxed{Q(s_{t+1}, p)} - Q(s_t, a) \right].$$

Over multiple training periods or iterations/epochs, the RL module is able to adapt to the user's persona and help the user navigate the space with other entities in a given environment with maximum reward function value.

At step 407, feedback is provided to the user when an identified object or entity Ei is within (or approaching) the individual minimum distance spacing Dmini for that object/entity. In selected embodiments, the feedback is provided to the user at a wearable device or AR edge device having a haptic/audio/visual interface for generating an optimal notification in the form of audio, visual, and haptic (e.g., vibratory) information based on the user's profile and/or environment. In selected embodiments, a server computing system (e.g., computing system 101) may employ artificial intelligence processing techniques, such as a machine learning model or reinforcement learning model, which are applied to the identified entities E (E1, E2, . . . En) identified at step 404 and/or categorization C (C1, C2, . . . Cn) generated at step 405 to compute, for each entity, a corresponding minimum distance spacing Dmin (Dmin1, Dmin2, . . . Dminn) from the entity Ei based on the categorization Ci preferred by a user. The feedback may be staged or increased in urgency as the user approaches the individual minimum distance spacing Dmini for an object/entity Ei, such as by providing a first haptic feedback signal when the user is approaching the individual minimum distance spacing Dmini, and providing a second, more urgent haptic feedback signal when the user reaches the individual minimum distance spacing Dmini.

In addition to providing the user feedback at step 407, the process is iteratively repeated to continue training the artificial intelligence model (step 406) to eventually configure the distance and notification metrics. In selected embodiments, the feedback mechanism may also include using an interface with distances assigned to different objects so that the user can manually indicate the minimum distance preferences for each object. This iterative feedback process continues until the process ends at step 408.

By now, it will be appreciated that there is disclosed herein a system, method, apparatus, and computer program product for providing navigation guidance around various object types in a vicinity of a guidance assistance device for a user. As disclosed, a first information handling system comprising a processor and a memory receives data regarding an environment around the guidance assistance device. In selected embodiments, the data regarding the environment is received at one or more wearable devices worn by the user. In other embodiments, the data regarding the environment is received by using a camera embedded in a wearable device worn by the user to record video data which comprises of audio and video regarding the environment around the guidance assistance device. At the first information handling system, the data regarding the environment around the guidance assistance device is analyzed to identify one or more entities E (E1, E2, . . . Ei). In selected embodiments, the data regarding the environment around the guidance assistance device is analyzed by employing a Region-Based Convolutional Neural Networks (R-CNN) model to identify from the video data one or more entities E (E1, E2, . . . Ei) in space and audio to associate with entities in the space while the user is navigating through the environment. In addition, an artificial intelligence (AI) machine learning analysis is applied to the identified entities E (E1, E2, . . . Ei) to group the one or more entities E (E1, E2, . . . Ei) into corresponding categories C (C1, C2, . . . Cj) and determine a minimum spacing distance Dmin (D1, D2, . . . Di) for each of the one or more entities E (E1, E2, . . . Ei), wherein the minimum spacing distance Dmin is a minimum distance between the guidance assistance device and the entity Ei based on the categorization Ci specified by the user. In selected embodiments, the minimum spacing distance Dmin for a first entity may be adjusted based on a state of the first entity. In other embodiments, the minimum spacing distance Dmin determined for each of the one or more entities E (E1, E2, . . . Ei) is iteratively monitored and adjusted based on heuristics or a learned comfort level for the user being in proximity to the one or more entities E (E1, E2, . . . Ei). In selected embodiments, the artificial intelligence (AI) machine learning analysis is applied by deploying a reinforcement learning model on the guidance assistance device for the user to generate an optimal notification to assist the user in navigating through the environment. The first information handling system provides feedback to the user when any of the one or more entities E (E1, E2, . . . Ei) is within than minimum spacing distance Dmin corresponding to said entity. In selected embodiments, feedback provided to the user is selected from a group consisting of audio, visual, and haptic based on a profile for the user and state of a first entity.

While particular embodiments of the present invention have been shown and described, it will be obvious to those skilled in the art that, based upon the teachings herein, changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A computer-implemented method for navigation guidance around various object types in a vicinity of a guidance assistance device for a user, the method comprising:
   receiving, by a first information handling system comprising a processor and a memory, data regarding an environment around the guidance assistance device;
   analyzing, by the first information handling system, the data regarding the environment around the guidance assistance device to identify one or more entities E (E1, E2, . . . Ei) and corresponding detected distances D (D1, D2, . . . Di) between the guidance assistance device and the one or more entities E (E1, E2, . . . Ei);
   applying an artificial intelligence (AI) machine learning analysis to group the one or more entities E (E1, E2, . . . Ei) into corresponding categories C (C1, C2, . . . Cj) and to determine a minimum spacing distance Dmin (Dmin1, Dmin2, . . . Dmini) for each of the one or more entities E (E1, E2, . . . Ei) based on a personal space profile specifying user-specific distance preferences for how close the user prefers to be in spatial relation to each of the corresponding categories C (C1, C2, . . . Cj); and
   providing feedback, by the first information handling system, to the user when any of the detected distances D (D1, D2, . . . Di) corresponding to the one or more entities E (E1, E2, . . . Ei) is within the than minimum spacing distance Dmin (Dmin1, Dmin2, . . . Dmini) corresponding to said one or more entities E (E1, E2, . . . Ei) entity.

2. The computer-implemented method of claim 1, where receiving data regarding the environment comprises receiving data regarding the environment at one or more wearable devices worn by the user.

3. The computer-implemented method of claim 1, where providing feedback to the user comprises providing feedback selected from a group consisting of audio, visual, and haptic based on a profile for the user and state of a first entity.

4. The computer-implemented method of claim 1, where the minimum spacing distance Dmin for a first entity is adjusted based on a state of the first entity.

5. The computer-implemented method of claim 1, wherein the minimum spacing distance Dmin determined for each of the one or more entities E (E1, E2, . . . Ei) is iteratively monitored and adjusted based on heuristics or a learned comfort level for the user being in proximity to the one or more entities E (E1, E2, . . . Ei).

6. The computer-implemented method of claim 1, where applying the artificial intelligence (AI) machine learning analysis comprises deploying a reinforcement learning model on the guidance assistance device to generate an optimal notification to assist the user in navigating through the environment.

7. The computer-implemented method of claim 1, where receiving data regarding the environment comprises using a camera embedded in a wearable device worn by the user to record video and audio data regarding the environment around the guidance assistance device.

8. The computer-implemented method of claim 7, where analyzing the data regarding the environment around the guidance assistance device comprises employing a Region-Based Convolutional Neural Networks (R-CNN) model to identify from the video data, the one or more entities E (E1, E2, . . . Ei) in space and audio to associate with entities in the space while the user is navigating through the environment.

9. An information handling system comprising:
   one or more processors;
   a memory coupled to at least one of the processors;
   a set of instructions stored in the memory and executed by at least one of the processors to provide navigation guidance around various object types in a vicinity of a guidance assistance device for a user, wherein the set of instructions are executable to perform actions of:
   receiving, by the system, data regarding an environment around the guidance assistance device;
   analyzing, by the system, the data regarding the environment around the guidance assistance device to identify one or more entities E (E1, E2, . . . Ei) and corresponding detected distances D (D1, D2, . . . Di) between the guidance assistance device and the one or more entities E (E1, E2, . . . Ei);
   applying an artificial intelligence (AI) machine learning analysis to group the one or more entities E (E1, E2, . . . Ei) into corresponding categories C (C1, C2, . . . Cj) and to determine a minimum spacing distance Dmin (Dmin1, Dmin2, . . . Dmini) for each of the one or more entities E (E1, E2, . . . Ei) based on a personal space profile specifying user-specific distance preferences for how close the user prefers to be in spatial relation to each of the corresponding categories C (C1, C2, . . . Cj); and providing feedback, by the system, to the user when any of the detected distances D (D1, D2, . . . Di) corresponding to the one or more entities E (E1, E2, . . . Ei) is within the than minimum spacing distance Dmin (Dmin1, Dmin2, . . . Dmini) corresponding to said one or more entities E (E1, E2, . . . Ei) entity.

10. The information handling system of claim 9, wherein the set of instructions are executable to provide feedback to the user by providing feedback selected from a group consisting of audio, visual, and haptic based on a profile for the user and state of a first entity.

11. The information handling system of claim 9, wherein the set of instructions are executable to adjust the minimum spacing distance Dmin for a first entity based on a state of the first entity.

12. The information handling system of claim 9, wherein the set of instructions are executable to iteratively monitor and adjust the minimum spacing distance Dmin for each of the one or more entities E (E1, E2, . . . Ei) based on heuristics or a learned comfort level for the user being in proximity to the one or more entities E (E1, E2, . . . Ei).

13. The information handling system of claim 10, wherein the set of instructions are executable to apply the artificial intelligence (AI) machine learning analysis by deploying a reinforcement learning model on the guidance assistance device to generate an optimal notification to assist the user in navigating through the environment.

14. The information handling system of claim 10, wherein the set of instructions are executable to receive data regarding the environment by receiving video data from a camera embedded in a wearable device worn by the user to record video and audio data regarding the environment around the guidance assistance device.

15. The information handling system of claim 14, wherein the set of instructions are executable to analyze the data regarding the environment around the guidance assistance device by employing a Region-Based Convolutional Neural Networks (R-CNN) model to identify, from the video data, the one or more entities E (E1, E2, . . . Ei) in space and audio to associate with entities in the space while the user is navigating through the environment.

16. A computer program product stored in a computer readable storage medium, comprising computer instructions that, when executed by an information handling system, causes the system to assist with navigation guidance around various object types in a vicinity of a guidance assistance device for a user by:

receiving, by the system comprising a processor and a memory, video data from a camera embedded in one or more wearable devices worn by the user to record video of the environment around the guidance assistance device;

analyzing, by the system, the video data regarding the environment around the guidance assistance device to identify one or more entities E (E1, E2, . . . Ei) and corresponding detected distances D (D1, D2, . . . Di) between the guidance assistance device and the one or more entities E (E1, E2, . . . Ei);

applying an artificial intelligence (AI) machine learning analysis to group the one or more entities E (E1, E2, . . . Ei) into corresponding categories C (C1, C2, . . . Cj) and to determine a minimum spacing distance Dmin (Dmin1, Dmin2, . . . Dmini) for each of the one or more entities E (E1, E2, . . . Ei) based on a personal space profile specifying user-specific distance preferences for how close the user prefers to be in spatial relation to each of the corresponding categories C (C1, C2, . . . Cj); and providing feedback, by the system, to the user when any of the detected distances D (D1, D2, . . . Di) corresponding to the one or more entities E (E1, E2, . . . Ei) is within the minimum spacing distance Dmin (Dmin1, Dmin2, . . . Dmini) corresponding to said one or more entities E (E1, E2, . . . Ei).

17. The computer program product of claim 16, further comprising computer instructions that, when executed by the system, causes the system to analyze the video data by employing a Region-Based Convolutional Neural Networks (R-CNN) model to identify from the video data one or more entities E (E1, E2, . . . Ei) in space and audio to associate with entities in the space while the user is navigating through the environment.

18. The computer program product of claim 17, further comprising computer instructions that, when executed by the system, causes the system to cluster each of the one or more entities E (E1, E2, . . . Ei) into one of the corresponding categories C (C1, C2, . . . Cj).

19. The computer program product of claim 18, further comprising computer instructions that, when executed by the system, causes the system to apply the artificial intelligence (AI) machine learning analysis by using a reinforcement learning model on the guidance assistance device to generate an optimal notification to assist the user in navigating through the environment.

20. The computer program product of claim 19, further comprising computer instructions that, when executed by the system, causes the system to iteratively monitor and adjust the minimum spacing distance Dmin for a first entity based on a state of the first entity or based on heuristics or a learned comfort level for the user being in proximity to the one or more entities E (E1, E2, . . . Ei).

* * * * *